United States Patent [19]

Marchionni et al.

[11] Patent Number: 5,446,205
[45] Date of Patent: Aug. 29, 1995

[54] FUNCTIONALIZED FLUOROPOLYETHERS

[75] Inventors: Giuseppe Marchionni; Piero Gavezotti, both of Milan; Ezio Strepparola, Treviglio, all of Italy

[73] Assignee: Ausimont S.r.l., Milan, Italy

[21] Appl. No.: 209,497

[22] Filed: Feb. 24, 1994

Related U.S. Application Data

[63] Continuation of Ser. No. 872,209, Apr. 22, 1992, abandoned, which is a continuation of Ser. No. 727,309, Jul. 10, 1991, abandoned, which is a continuation of Ser. No. 614,551, Nov. 15, 1990, abandoned, which is a continuation of Ser. No. 346,480, May 2, 1989, abandoned.

[30] Foreign Application Priority Data

Apr. 20, 1989 [IT] Italy ............... 47869/89

[51] Int. Cl.$^6$ ............................................. C07C 45/00
[52] U.S. Cl. ...................................... 568/603; 568/604
[58] Field of Search .............................. 568/603, 604

[56] References Cited

U.S. PATENT DOCUMENTS

| | | | |
|---|---|---|---|
| 3,715,378 | 2/1973 | Sianesi et al. | 568/604 U X |
| 4,178,465 | 12/1979 | Caporiccio et al. | 568/604 |
| 4,267,238 | 5/1981 | Chernega | 428/422 |
| 4,268,556 | 5/1981 | Pedrotty | 428/422 |
| 4,657,687 | 4/1987 | Caporiccio et al. | 568/604 |
| 4,757,145 | 7/1988 | Caporiccio et al. | 568/604 |
| 4,827,042 | 5/1989 | Lagow et al. | 568/604 |

FOREIGN PATENT DOCUMENTS 393230 10/1990 European Pat. Off. .

Primary Examiner—Johann Richter
Attorney, Agent, or Firm—Morgan & Finnegan

[57] ABSTRACT

Fluoropolyethers having functional groups, consisting of randomly distributed sequences of perfluoropolyoxyalkylene units selected from:

$$-CF_2-CF-O-;\ -CF_2-CF_2-O-;$$
$$\quad\quad\quad |$$
$$\quad\quad CF_3$$

$$-CF_2O-;\ CFO-$$
$$\quad\quad\quad\quad |$$
$$\quad\quad\quad\quad CF_3$$

and included in one of the following formulas:

$$T-O\left(\underset{\underset{CF_3}{|}}{CF_2CFO}\right)_n\left(\underset{\underset{X}{|}}{CFO}\right)_m-CRR'-Y \quad (I)$$

$$T'-O-(CF_2CF_2O)_p(CF_2O)_s-CRR'-Y \quad (II)$$

$$T''O-(CF_2CF_2O)_o\left(\underset{\underset{CF_3}{|}}{CF_2CFO}\right)_q\left(\underset{\underset{X}{|}}{CFO}\right)_z-CRR'-Y \quad (III)$$

where X is F or $CF_3$ T, T', T″=a perfluoroalkyl group containing from 1 to 3 carbon atoms and one or two atoms of Cl, Br or I;
R, R′=halogen atoms;
Y=a functional group;
o, q=numbers, zero included, such that o+q=1-20;
n=a number ranging from 1 to 15;
m/n=a number ranging from 0.01 to 0.5;
p=a number ranging from 1 to 20;
s/p=a number ranging from 0.5 to 2; and
z/o+p=a number ranging from 0.01 to 0.05.

2 Claims, No Drawings

FUNCTIONALIZED FLUOROPOLYETHERS

This is a continuation of application Ser. No. 07/872,209, filed on Apr. 22, 1992, now abandoned, which is a continuation of 07/727,309, filed Jul. 10, 1991, now abandoned, which is a continuation application of 07/614,551, filed Nov. 15, 1990, now abandoned, which is a continuation application of 07/346,480, filed on May 2, 1989, now abandoned.

DESCRIPTION OF THE INVENTION

The present invention relates to functionalized fluoropolyethers consisting of randomly distributed sequences of perfluorooxyalkylene units selected from:

$$-CF_2-CF(CF_3)-O-;\ -CF_2-CF_2-O-;$$

$$-CF_2O-;\ CF(CF_3)O-$$

and having a functional end group Y, the other end group being a perhaloalkyl group containing one or two atoms of a halogen other than fluorine, such fluoropolyethers being included in the following formulas (I), (II) and (III):

$$T-O\left(\begin{array}{c}CF_2CFO\\|\\CF_3\end{array}\right)_n\left(\begin{array}{c}CFO\\|\\X\end{array}\right)_m CRR'-Y \quad (I)$$

where:
X is F or $CF_3$; R is F or Cl or Br or I; R', equal to or different from R, is also F or Cl or Br or I;
T is a perhaloalkyl group containing from one to three carbon atoms and one or two atoms of Cl or Br or I; in particular, T may be:

$$Alog\ CF_2-;\ Alog\ CFCF_2-;\ Alog\ CF_2CF(CF_3)-;$$
$$\qquad\qquad\quad\ \ |$$
$$\qquad\qquad\quad\ CF_3$$

where
Alog is Cl or Br or I;
n ranges from 1 to 15, with m/n being between 0.01 and 0.5;
Y may be a $-CN$ or $-CH_2Z$ or $-COR'''$ group, or:

$$-C\!\!\stackrel{N}{\diagup}\!\!\bigcirc\!\!\diagdown\!\!E\ , \text{ or } \begin{array}{c}N\\|\\-\bigcirc-\\|\\N\ \ N\end{array}$$

where:
E may be NH, or an atom of O or S, and furthermore:
(A) when $Y=-CH_2Z$, Z may be a group $OR''$, where $R''$ may be a hydrogen atom, or a group:

$$-C-CH=CH_2;\ -C-C=CH_2;\ -(CH_2CH_2O)_bH$$
$$\ \|\qquad\qquad\quad\ \|\ \ |$$
$$\ O\qquad\qquad\quad\ O\ CH_3$$

where b is a number ranging from 1 to 15;

$$-(CH_2CH_2O)_b-C-CH=CH_2;$$
$$\qquad\qquad\qquad\ \ \|$$
$$\qquad\qquad\qquad\ \ O$$

$$-(CH_2CH_2O)_b-C-C=CH_2;\ -CH_2-CH=CH_2;$$
$$\qquad\qquad\qquad\ \ \|\ \ |$$
$$\qquad\qquad\qquad\ \ O\ CH_3$$

$$-CH_2-C=CH_2;\ -(CH_2-CH-CH_2O)_cH$$
$$\qquad\ \ |\qquad\qquad\qquad\ |$$
$$\qquad\ CH_3\qquad\qquad\quad\ OH$$

(c = a number from 1 to 3);

$$-CH_2-CH\!\!-\!\!-\!\!CH_2;\ -CH_2COR_1$$
$$\qquad\quad\diagdown\!\!O\!\!\diagup\qquad\qquad\ \|$$
$$\qquad\qquad\qquad\qquad\qquad\ \ O$$

where $R_1$ = and alkyl containing from 1 to 30 carbon atoms, and optionally containing ethereal bonds of the type $-C-O-C-$, or $R_1$ is a group $-(CH_2-CH_2O)_dH$ where d is a number between 1 and 15;

$$-CH_2-C-OH;\ -CH_2-CH_2-CH_2SO_3H;$$
$$\qquad\ \|$$
$$\qquad\ O$$

$$-\bigcirc\!\!\diagup\!\!\stackrel{NO_2}{\diagdown}\!\!\stackrel{}{NH_2};$$

and furthermore a naphthyl group, a benzl group or a mono- or poly-substituted alkyl or alkoxy benzyl group of the type:

$$-CH_2-\bigcirc\!\!\stackrel{O\diagdown}{\diagdown_O}\!\!CH_2,\ -CH_2-\bigcirc\!\!\stackrel{OR_2}{\diagdown_{OR_2}}$$

where $R_2$—an alkyl containing from 1 to 4 carbon atoms; said alkyl and alkoxy benzyl group optionally containing one or more substituents; or Z may be a nitrogen-containing group $-NR_3R_4$; where $R_3$ and $R_4$, alike or different from each other, may be hydrogen atoms or they may be, either individually or both, $R_1$ groups as defined above, or when $R_3=H$, $R_4$ may be a group:

$$-C-CH=CH_2\ \text{or}\ -C-C=CH_2;$$
$$\ \|\qquad\qquad\qquad\ \|\ \ |$$
$$\ O\qquad\qquad\qquad\ O\ CH_3$$

or $R_3$ and $R_4$ together may form a cyclic imide of formula:

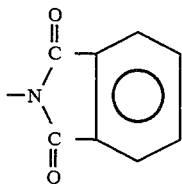

wherein the phenyl group may contain a substituting group of the anhydride type;

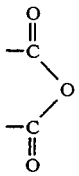

(B) when Y=a COR''' group, R''' may be an —NHR$_5$ group, where R$_5$ may be hydrogen or alkyl with 1 to 8 carbon atoms, or R$_5$ may be a mono- or poly-hydroxyalkyl with 1 to 8 carbon atoms, an aminoalkyl with 1 to 8 carbon atoms, an ally group, a methallyl group, a trimethoxy- or triethoxysilanealkyl group of formula: R$_6$—Si(OCH$_3$)$_3$ or R$_6$Si(OC$_2$H$_5$)$_3$, where R$_6$=an alkylene with 1 to 8 carbon atoms, or an isocyano alkyl of formula R$_6$NCO, or an isocyanocycloalkyl group with 5 to 6 carbon atoms, or an isocyano aryl group with 6 to 10 carbon atoms, optionally alkyl-substituted; or R''' may be an aromatic radical optionally alkyl- or halogen-substituted such as, for example: pentafluorophenyl, bromotetrafluoro-phenyl, dibromodifluorophenyl, bromophenyl, bromobenzophenyl,

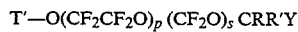 (II)

where:
T'=Alog CF$_2$CF$_2$—; Alog CF$_2$—; Alog CF$_2$CF(Alog)—;
R, R', Alog, Y are the same as defined above for formula (I); p ranging from 1 to 20, and s/p from 0.5 to 2.

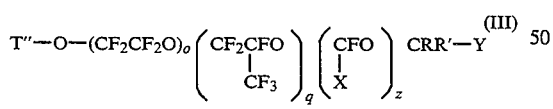

where:
Y, X, R and R' are the same as defined above for formula (I),
T'' is equal to T or T', o and q are numbers, zero included, o+q=1-20, z/o+q ranging from 0.01 to 0.05.

The products of the present invention may be prepared starting from fluoropolyethers consisting of randomly distributed sequences of perfluorooxyalkylene units selected from:

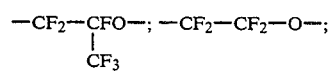

-continued

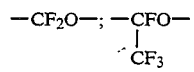

and included in the following formulas:

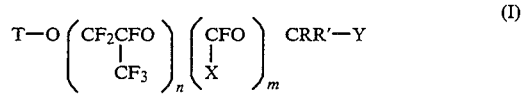 (I)

where:
X is F or CF$_3$; R is F or Cl or Br or I; R', like or different from R, is also F or Cl or Br or I;

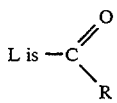

with R being the same as defined above, or L is the corresponding —COOH group or a salt or an ester thereof;

T is a perhaloalkyl group containing from 1 to 3 carbon atoms and one or two atoms of Cl or Br or I: in particular T may be Alog CF$_2$—,

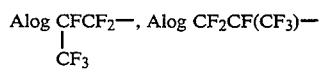

where Alog is Cl or Br or I; n ranges from 1 to 15, and m/n ranges from 0.01 to 0.5;

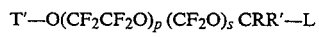 (II)

where:
T'=Alog CF$_2$CF$_2$—; Alog CF$_2$—; Alog CF$_2$CF(Alog)
L, R, R', Alog are the same as defined above for formula (I), p ranges from 1 to 20, s/p ranges from 0.5 to 2.

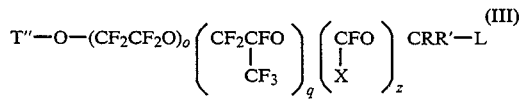 (III)

where:
L, X, R and R' are the same as defined above for formula (I),
T'' is equal to T or T', o and q are numbers, zero included, o+q =1-20, z/o+q =from 0.01 to 0.05.
In particular, the following cases are possible:
1) Y=—COR'''.
In such case, the possibilities are as follows:
(a) R'''=NHR$_5$ group.
In this case, the products are of the amidic type. They are preparable by reacting ammonia or amines of formula NH$_2$R$_5$ with the corresponding alkyl esters, if the amines are strongly basic, or with the corresponding phenyl esters or the corresponding acylhalides, if the amines are weakly basic or highly sterically hindered. Separation and purification of the products are carried out by conventional techniques. Another method comprises reacting the fluoropolyether having the acid end group —COOH with compounds containing —NCO(isocyanate) groups at temperatures ranging from 100° to 120° C., with CO₂ generation.

(b) R'''=an optionally substituted aromatic radical. In this case it is a question of ketonic products, which are preparable by means of the Friedel-Craft reaction between the corresponding aromatic compound and the perfluoropolyether containing the acyl group —COCl, or by means of reaction between lithium-aromatic derivatives and perfluoropolyethers having an ester end group.

2) Y'=CH₂Z

In this case the possibilities are as follows:

(a) Z=OR''. In this case, the products are obtainable from the corresponding carboxylic (or ester) starting products by reduction of the group

with Li, Na, B, Al complex hydrides.

Usually, the origin product is the alcoholic derivative —CH₂OH. The subsequent derivatives are preparable by nucleofilic reaction of the alcoholate with compounds of formula R''X, where X is a movable halogen, generally chlorine, or by addition of the alcoholate to epoxy cyclic compounds. For example:

when R''=a group

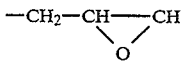

it is possible to operate by reaction of the Na or K alcoholates with epichlorohydrin in excess; after having removed the epichlorohydrin excess, neutralization is cautiously carried out under cold conditions and glycidyl ether is separated by extraction and, if necessary, by distillation;

when R''—a group

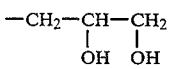

it is possible to operate by reaction of alcohols —CH₂OH in the presence of alcoholate traces (as a catalyst) on glycidyl alcohol at 60°–80° C. then by acidification and separation of the polyhydroxy derivative;

when R''=a —CH₂COOR group it is possible to operate by reaction of the Na or K alcoholate on ethyl chloroacetate in an ether-solvent; the product is obtained after repeatedly washing the organic phase with water, optionally enriched with FC 113 (1,1,2-trichloro-1,2,2-trifluoroethane);

when R''=

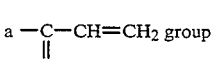

it is possible to operate by reaction of the alcohols with acrylylchloride in an ether solvent in the presence of tertiary bases;

when R''=a —(CH₂CH₂O)$_d$H group it is possible to operate by reaction of the alcohols in the presence of catalytic amounts of alcoholates with ethylene oxide at temperatures around 100° C.;

when R''=a group

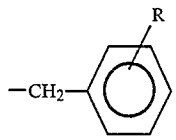

it is possible to operate by reaction of the alcoholates with the chloromethyl aromatic derivatives in inert solvents;

when R'' is a —CH₂—CH=CH₂ group, it is possible to operate by the reaction of the alcoholates with allyl chloride or bromide under such conditions as to cause the precipitation of the alkaline chlorides or bromides, and by extration of the allyl-ethers. For functional groups which are farther away from the perfluoropolyether chain, the reactions already known in organic chemistry are utilizable, as in such position there is no longer any influence of the fluoroether group.

(b) Z = —NR₃R₄. When Z = —NR₃R₄, the products are preparable by reduction, according to conventional methods, of the corresponding amidic derivatives when R₃ and R₄ do not contain reducible groups. In the contrary case, the products are obtained from the corresponding perfluoropolyethers containing end group

prepared as mentioned above, by reduction with the above-cited hydrides, and by subsequent reaction of one or two hydrogen atoms of the —NH₂ group with R₄X compounds (X=halogen), or, when R₃ and R₄ form a cyclic imide, by direct reaction of the —NH₂ group with a cyclic anhydride:

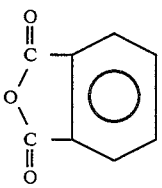

carried out in polar aprotic solvents, or in bulk at high temperatures ( 150°–20° C.).

(3) When Y=CN, the products are obtained by dehydration with P₂O₅, at temperatures from 100° to 200° C., of the —CONH₂ group of the corresponding amidic derivative.

The fluoropolyethers having an acid functional end group to be used as starting products for preparing the compounds of the present invention, may be prepared by photooxidation of perfluoropropene and/or tetrafluoroethylene in the presence of minor amounts of a fully halogenated ethylene containing fluorine and at least one atom of a halogen other than fluorine. The photooxidation product is then thermally treated to remove the peroxide groups contained therein.

Such fluoropolyethers and the process for preparing them are described in the commonly-owned Italian patent application No. 20,406 A/88 corresponding to U.S. patent application No. 346,458, filed on May 2, 1989, the content of which is incorporated herein by reference.

As regards utilization, in the first place, it is used as a fluorinated surfactant in the form of a salified monocarboxylic acid (ammonium salt or alkali metal salt), or in the protection of monuments and of stony materials in general against atmospheric agents.

The functionalized fluoropolyethers of the present invention are particularly capable of reacting with organic and inorganic substrates, as well as with end groups containing 1 or 2 atoms of a halogen different from fluorine. They are used as surface modifiers for polymeric and inorganic materials, in order to impart properties which are typical of fluorinated products such as water- and oil-repellency, low coefficients of friction, low refractive index, and the like.

The following examples are given still better to illustrate the present invention, but they are not to be construed as a limitation thereof.

EXAMPLE 1

17 g of a mixture of acids of formula:

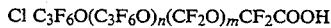
$$Cl\ C_3F_6O(C_3F_6O)_n(CF_2O)_mCF_2COOH$$

prepared according to the procedures described in Examples 1 through 6 of Italian patent application No. 20,406 A/88, where n has an average value of 0.85 and M has an average value of 0.02, were mixed with 6 g of $P_2O_5$, and the resulting mixture was heated from 100° to 200° C. in a glass flask having, superposed thereon, a Vigreux column (8×150 mm) and a Liebig cooler. There were thus obtained 12 g of a liquid distilling from 170° absorptions at 1805-1870 cm$^{-1}$ characteristic of carbonyl groups, and by the absence of bands attributable to hydroxyls in the region from 3300 to 3600 cm$^{-1}$. Thus, the structure of an anhydride of formula:

$$(Cl\ C_3F_6O(C_3F_6O)_{0.85}(CF_2O)_{0.02}CF_2CO)_2O$$

is attributable to the compound.

14 g of the same acid were reacted with 10 cc of thionyl chloride for 8 hours under reflux, in the presence of 0.1 g of pyridine. After reaction, most of the thionyl chloride was distilled off, then the resulting concentrate was distilled, thereby obtaining, from 105° to 120° C. (at 760 mm Hg), 9 g of a product characterized, on infrared analysis, by a marked absorption at 1805 cm$^{-1}$ and by the absence of absorptions from 3300 to 3600 cm$^{-1}$. On the basis of the percent content of hydrolyzable chlorine (with aqueous NaOH 0.5 N), the formula:

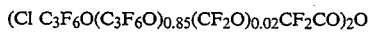
$$CL(C_3F_6O(C_3F_6O)_{0.85}(CF_2O)_{0.02}CF_2COCl$$

was attributed to the product.

7 g of such product, mixed with 1.5 g of anhydrous benzene, were added to a suspension of 3.5 g of AlCl$_3$ in 15 cc of CH$_2$Cl$_2$, cooled to 0° C. and maintained under stirring. During the reaction, the mixture turned red and became homogeneous; after a 4-hour reaction, the mixture was poured into iced water, and the demixed organic phase was collected, washed with water and bicarbonate, dried on Na$_2$SO$_4$ concentrated by CH$_2$Cl$_2$ and distilled, thereby obtaining, at 195°-198° C., a compound (3 g) characterized, in the infrared spectrum, by absorption bands at 1720 cm$^{-1}$ characteristic of a carbonyl and at 1500 and 1600 cm$^{-1}$ characteristic of the benzene ring, wherefore the structures:

$$Cl\ C_3F_6O(C_3F_6O)_{0.85}(CF_2O)_{0.02}CF_2COC_5H_5$$

was attributed to the product.

EXAMPLE 2

90 g of a mixture of acids of formula:

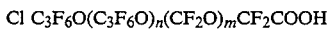
$$Cl\ C_3F_6O(C_3F_6O)_n(CF_2O)_mCF_2COOH$$

prepared as in Example 1, where n has an average value of 1.27 and m is equal to 0.05, were reacted with 100 g of ethanol at 99.9% in the presence of 2 g of H$_2$SO$_4$ at 96% and 60 g of benzene, in a 250 cc flask, with a rectification column (1×100 cm) packed with Helipack superposed thereon. The temperature was maintained at such level as to keep the mixture boiling. For 3 hours no distillate was withdrawn, then, with a reflux ratio of about 20, the azeotrope (water, benzene, ethanol =43 ml) was collected on the top in 6 hours; then, by reducing the reflux ratio to 5, most of the benzene-ethanol azeotrope (140 ml) was allowed to distill. At the end, the obtained product was poured into iced water and immediately separated, whereafter it was dried on Na$_2$SO$_4$ and distilled, thereby collecting, at 170°-180° C., 82 g of product.

On infrared analysis, such product no longer exhibited the bands which are typical of the acid, and it could not be titrated with a solution of triethylamine in methanol, contrary to the starting mixture of acids.

The N.M.R. analysis evidenced the presence of the ester group:

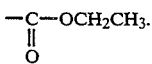
$$-\underset{\underset{O}{\|}}{C}-OCH_2CH_3.$$

43 g of the ethyl ester so obtained were dissolved in 150 cc of ethyl ether cooled to 0° C. and a gaseous ammonia flow was conveyed for 2 hours to the solution. During such period of time the reaction was completed. After evaporation of the ether, the remained liquid was rectified, so that it was possible to collect, between 240° and 260° C., a product, which, on infrared analysis, was characterized by absorptions at 1740 cm$^{-1}$ and 1610 cm$^{-1}$.

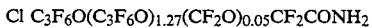
$$Cl\ C_3F_6O(C_3F_6O)_{1.27}(CF_2O)_{0.05}CF_2CONH_2$$

was attributable.

14 g of the above-mentioned ethyl ester were dissolved in 10 cc of ethyl ether and were addtioned with 2.4 cc of n-butylamine.

The mixture was reacted for 1 hour, then the solvent was concentrated and distillation was carried out, thereby collecting, between 220° and 230° C., a product which, on elemental analysis (C=34.4%, Cl=7.9%, F=40.5%, H=2%) and on infrared and N.M.R. $^{19}$F analyses, was shown to be the amide of structure:

$$Cl\ (C_3F_6O(C_3F_6O)_{1.27}(CF_2O)_{0.05}CF_2CONHC_4H_9.$$

EXAMPLE 3

9.4 g of the amide of formula:

Cl $C_3F_6O(C_3F_6O)_{1.27}(CF_2O)_{0.05}$—$CF_2CONH_2$ of the preceding example were mixed in a glass flask, equiped with a cooler, with 20 g of $P_2O_5$ and the resulting mixture was heated for 2 hours at 150 °–180° C. After having removed the cooler the thus obtained liquid product was distilled, which was then distilled again, thereby collecting 7 g of fraction boiling between 120° and 130° C.

The product of that fraction is characterized, on infrared analysis, by a sharp absorption band at 2250 cm$^{-1}$, which is typical of the —CN group, wherefore the formula of the nitrile:

Cl $C_3F_6O(C_3F_6O)_{1.27}(CF_2O)_{0.05}CF_2CN$ is attributed to the product.

EXAMPLE 4

A sample (20 g) of phenyl ester of formula:

Cl $C_3F_6O(C_3F_6O)_{1.27}(CF_2O)_{0.05}CF_2COOC_6H_5$ prepared, starting from 10 cc of the acid described in Example 2, by reactions of conversion to the corresponding acyl chloride and subsequent reaction with phenol in the presence of pyridine and washing with an agueous alcoholic solution, was reacted with 3.7 g of O-phenylenediamine by gradually heating from 30° to 200° C. carried out in 20 hours. The product obtained was a green solid, having a melting temperature of 65°–70° C. and a boiling temperature of 230°–260° C., and was characterized by sharp absorption bands in the infrared spectrum, at 1450, 1490, 1540, 1590 cm$^{-1}$ (relevant to condensed rings and to grouping —C=N— in the ring), as well as by a broad absorption in the area between 2700.and 3100 cm$^{-1}$ due to C—H and N—H bonds.

Elemental analysis (C=32.5%, Cl=6.4%, H=0.1%, F=54.9%) confirmed that the product had the following structure:

$ClC_3F_6O(C_3F_6O)_{1.27}(CF_2O)_{0.05}$—$CF_2C$ (benzimidazole ring, N=, N—H)

EXAMPLE 5

10 g of the nitrile of Example 3 were reacted in a glass vial at a temperature of −50° C. with anhydrous ammonia in excess. The excess ammonia was removed from the product, to which the structure of the corresponding amidine of formula:

$ClC_3F_6O(C_3F_6O)_{1.27}(CF_2O)_{0.05}$—$CF_2C(=NH)(NH_2)$ was attributed on the basis of the typical infrared absorption bands at 1600 cm$^{-1}$, characteristic of the iminic group, and in the area between 3400–3100 cm$^{-1}$ characteristic of N—H bonds.

A sample (5 g) of the amidine so obtained, after gradually heating up to 300° C. in 8 hours until the conclusion of evolution of ammonia, was thereby converted to a highly viscous liquid characterized, on infrared analysis, by a single sharp absorption band at 1550 cm$^{-1}$, corresponding to the —C=N—group of the triazine ring, wherefore the structure of simpolyoxachloroperfluoroalkyltriazine of formula (triazine structure with three $R_f$ groups)

where $R_f$= the radical $ClC_3F_6O(C_3F_6O)_{1.27}(CF_2O)_{0.05}$—$CF_2$)— is attributable to the compound.

EXAMPLE 6

50 g of ethyl ester:

$ClC_3F_6O(C_3F_6O)_{1.27}(CF_2O)_{\overline{0.05}}CF_2COOC_2H_5$ according to Example 2, were added in 2 hours to a suspension of 4 g of LiAlH$_4$ in 250 cc of anhydrous ethyl ether, at a temperature ranging from room temperature to 35° C. After a 3-hour reaction, the excess of LiAlH$_4$ was decomposed with HCl at 5%, the ether phase was separated, dried with Na$_2$SO$_4$, concentrated and then distilled at atmospheric pressure, whereafter the fraction of product boiling from 150° to 170° C. was collected.

On infrared analysis, this product no longer exhibited the absorption bands attributable to carbonyl, but a broad band attributable to the hydroxyls. By treatment with a weighed amount of acetic anhydride, in the presence of pyridine and ethyl ether, after 12 hours, by hydrolyzing the excess of anhydride, acetic acid was countertitrated and for such product an equivalent molecular weight of 490, referred to hydroxyls, was obtained.

NMR($^1$H) analysis confirmed the following structure of the product:

$ClC_3F_6O(C_3F_6O)_{1.27}(CF_2O)_{0.05}CF_2CH_2OH$.

EXAMPLE 7

55 g of amide:

$Cl_3F_6O(C_3F_6)_{1.27}(CF_2O)_{\overline{0.05}}CF_2CONH_2$ prepared according to Example 3 were added, in 2 hours, to a suspension of 4 g of LiAlH$_4$ in 300 cc of ethyl ether at room temperature.

After a 2-hour reaction at room temperature and a 2-hour reaction at 35° C., the excess of LiAlH$_4$ was decomposed at 0° C. with an aqueous solution of tetrahydrofuran whereafter 500 g of H$_2$O and 50 cc of aqueous NaOH at 40% were added to the mixture.

The organic layer was separated, dried on Na$_2$SO$_4$ and distilled the fraction boiling between 140° and 160° C. (40 g) was collected.

The infrared analysis no longer revealed absorption bands attributable to carbonyl groups.

The structure:

$ClC_3F_6O(C_3F_6O)_{1.27}(CF_2O)_{0.05}CH_2NH_2$ was attributable to the product.

The aminic equivalent weight, determined by titration with $HClO_4$ (0.1 N in acetic acid), was equal to 495.

EXAMPE 8

A solution of 1.6 cc of acrylyl chloride in 20 cc of ethyl ether was added to a solution of 11 g of an amine of formula:

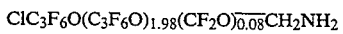
$ClC_3F_6O(C_3F_6O)_{1.98}(CF_2O)_{\overline{0.08}}CH_2NH_2$ prepared according to the method of Example 7, starting from the amide of the corresponding acid, and 2.8 cc of triethylamine in 100 cc of ethyl ether cooled to 0° C. and maintained under stirring. The mixture was reacted for 3 hours at 0° C. after which it was filtered.

The ethereal solution so obtained was additioned with 0.1 g of phenothiazine

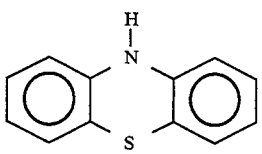

then it was concentrated and distilled: 7 g of the fraction of product were collected from 105° to 115° C., under a pressure of 15 mm Hg. Such product was characterized by absorption bands in the infrared spectrum, at 1730 cm$^{-1}$, attributable to carbonyl, and at 1625 cm$^{-1}$, attributable to the double bond.

The structure of an acrylamide of formula:

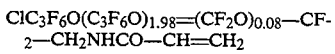
$ClC_3F_6O(C_3F_6O)_{1.98}=(CF_2O)_{0.08}-CF_2-CH_2NHCO-CH=CH_2$ was attributable to the product.

The NMR ($^1H$) analysis also confirmed the above-indicated structure.

EXAMPLE 9

A mixture of acids of formula

$TO(C_2F_4O)_n(CF_2O)_mCF_2COOH$ obtained according to the procedure of Examples 9 to 19 of Italian patent application No. 20,406 A/88, where: $T = ClCF_2$ or $ClCF_2CF_2$, m/n = 1.2 with a molar ratio: —COOH/T = 1.1, and having an average molecular weight equal to 900, was esterified as described in Example 2.

After removal of the alcoholic phase, the layer consisting of the ethyl esters of the perfluorinated acids was purified by stripping under vacuum at 100° C. for 2 hours.

150 g of such ethyl esters were distilled: the products were collected from 195° to 210° C., and were characterized, on infrared analysis, by absorption at 1790 cm$^{-1}$.

These products were then reduced to monofunctional alcohols of formula:

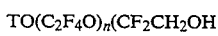
$TO(C_2F_4O)_n(CF_2CH_2OH$ by means of LiAlH$_4$, as described above in Example 6.

The products so obtained had a boiling temperature ranging from 175° to 190° C.

EXAMPLE 10

A mixture of acids of formula:

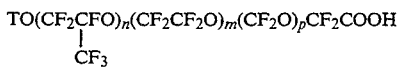
$TO(CF_2CFO)_n(CF_2CF_2O)_m(CF_2O)_pCF_2COOH$
         $|$
         $CF_3$ prepared according to Examples 21–23 of Italian patent application No. 20,406 A/88,
where $T = ClC_3$—, or $ClCF_2$—, $ClC_2F_4$—, and characterized by average values of m, n and p such that p/m+n=0.02 and m/n=0.5, a —COOH/T molar ratio=about 1, and an average molecular weight of 850, was reacted as in Example 2 in order to obtain the corresponding ethyl ester. 20 g of such ester were dissolved in 100 cc of a 1/1 by volume solution of ethyl ether and FC 113 (1,1,2-trichloro-1,2,2-trifluoroethane) cooled to 0° C.

The solution was subjected to a gaseous ammonia flow for 3 hours. After evaporation of the solvent, the residue consisted of a mixture of amides of formulas

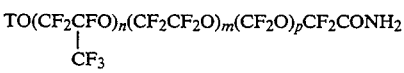
$TO(CF_2CFO)_n(CF_2CF_2O)_m(CF_2O)_pCF_2CONH_2$
         $|$
         $CF_3$ as confirmed by the presence of absorption bands at 1740 cm$^{-1}$ in the infrared spectrum, where T, n, m and p are the same as defined hereinbefore.

EXAMPLE 11

10 g of the amides mixture obtained in Example 10 were treated with 20 g of $P_2O_5$ at 150°–180° C. for 3 hours. The liquid product obtained from the reaction was recovered by distillation and identified as a mixture of nitriles of formula

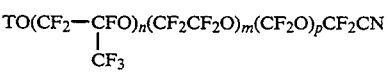
$TO(CF_2-CFO)_n(CF_2CF_2O)_m(CF_2O)_pCF_2CN$
         $|$
         $CF_3$ by infrared analysis (absorption at 2250 cm$^{-1}$).

EXAMPLE 12

50 g of ethyl ester

$ClC_3F_6O(C_3F_6O)_{1.27}(CF_2O)_{0.05}CF_2COOC_2H_5$ prepared according to Example 2 were dissolved in 150 cc of a mixture of 1,1,2-trichloro-1,2,2-trifluoroethane (FC 113) and methanol in a 1/1 weight ratio. Such solution was then additioned with 15 g of aminopropyltriethoxysilane and then heated at reflux. On conclusion of the reaction, the solvent and the reagent in excess were evaporated.

The infrared analysis revealed the disappearance of the ester absorption band at 1790 cm$^{-1}$ while the presence of a band at 1740 cm$^{-1}$ characteristic of the amidic group was observable.

The NMR analysis (ISF and $^1H$) revealed that the product had the following structure:

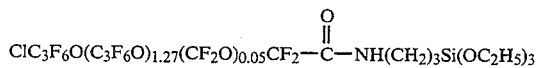

EXAMPLE 13

A sample of 50 g of a mixture of methylesters prepared according to the procedure described in Example 20 of Italian patent application No. 20,406 A/88, starting from a brominated product obtained according to Example 25 of said application, such esters having formula:

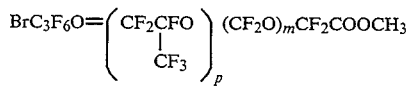

where p has an average value of 2.52 and m has an average value of 0.1, and having a molecular weight equal to 800, was added dropwise to a solution of 3.5 g of anhydrous NaBH$_4$ dissolved in 100 ml of absolute ethyl alcohol, at a temperature around 20° C. On conclusion of dropping (40 minutes), the whole was maintained under stirring at 20° C. for 1 hour, then an aqueous solution of hydrochloric acid at 5% was introduced till a decidedly acid pH was obtained. 80% of the introduced ethyl alcohol was distilled off and, after cooling, from the heavy phase there were obtained, by distillation under vacuum (0.5-1 mm Hg at 90°-110° C.), 39 g of an oil which, on infrared analysis, did not exhibit any absorption attributable to carbonyl, but a pronounced band in the region indicating hydroxyls.

By titration with acetic anhydride, as shown in Example 6, an equivalent weight, referred to hydroxyl, equal to 650, corresponding to formula:

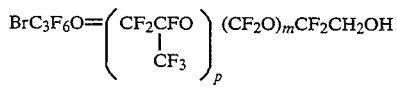

was obtained.

What is claimed is:

1. A functionalized fluoropolyether defined by the formula (II):

where: R is selected from the group consisting of F, Cl, Br and I; R', equal to or different from R, is selected from the group consisting of F, Cl, Br, and I; T' is selected from the group consisting of Alog—CF$_2$CF$_2$—; Alog—CF$_2$—; and Alog CF$_2$CF—(Alog)—;

where Alog is [Cl,] Br [or I];
p ranges from 1 to 20, with s/p being between 0.5 and 2.0; Y is selected from the group consisting of —CN, —CN$_2$Z, —COR''',

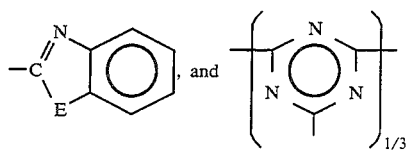

where:
E is —NH—, —O— or —S—, and furthermore with the proviso: (A) when Y is —CH$_2$Z, Z is OR'', where R'' is a hydrogen atom, or:

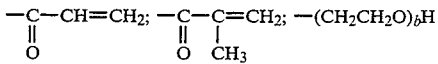

(where b is a number ranging from 1 to 15);

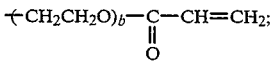

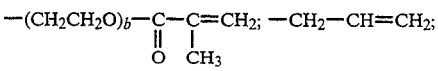

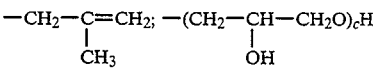

(c=a number from 1 to 3);

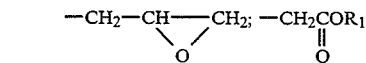

Where R$_1$ is an alkyl containing from 1 to 30 carbon atoms, with and alkyl containing from 1 to 30 carbon atoms with ether bonds of type —C—O—C—, or —(CH$_2$—CH$_2$O)$_d$H, wherein d is a number ranging from 1 to 15 ;

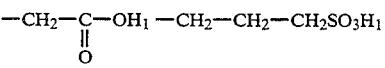

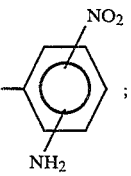

a naphthyl group; a benzyl group; or a mono- or poly-substituted alkyl or akoxy benzyl group of the type:

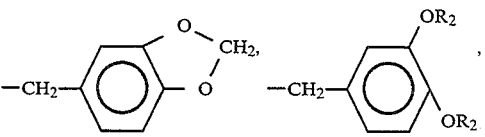

where R$_2$=an alkyl containing from 1 to 4 carbon atoms; or Z is a nitrogen—containing group —NR$_3$R$_4$ where R$_3$ and R$_4$, alike or different from each other, are hydrogen atoms or they are, either individually or both, R$_1$ groups as defined above, or, when R$_3$=H, R$_4$ is:

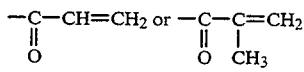

or $R_3$ and $R_4$ together form a cyclic imide of formula:

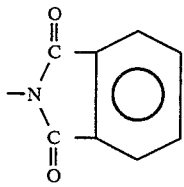

wherein the phenyl group contains a substituent group of the anhydride type;

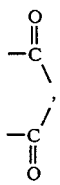

(B) and when $Y = COR'''$, $R'''$, is selected from the group consisting of $-NHR_5$, where $R_5$ is hydrogen, $C_1-C_8$ alkyl, $C_1-C_8$ mono- or poly-hydroxyalkyl, $C_1-C_8$ aminoalky, allyl group, methallyl group, $R_6-Si(OCH_3)_3$ or $R_6Si(OC_2H_5)_3$, where $R_6$ is $C_1-C_8$ alkylene, $-R_7$ NCO where $R_7$ is $C_1-C_8$ alkylene, $C_5-C_6$ cycloalkylene, $C_6-C_{10}$ arylene, an unsubstituted aromatic radical or a substituted aromatic radical selected from the group consisting of pentafluorophenyl, bromotetrafluorophenyl, dibromodifluorophenyl, bromophenyl and bromobenzophenyl.

2. A functionalized fluoropolyether defined by one of the following formulas:

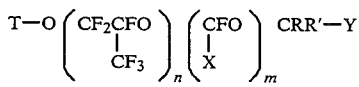

where: X is F or $CF_3$; R is selected from the group consisting of F, Cl, Br, and I; R', equal to or different from R, is selected from the group consisting of F, Cl, Br, and I; T is a perhaloalkyl group containing from one to three carbon atoms and one or two atoms of Br; T is selected from the group consisting of Alog $CF_2-$;

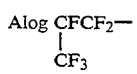

and Alog $CF_2CF(CF_3)-$;
where Alog is Br;
n ranges from 1 to 15, with m/n being between 0.01 and 0.5; Y is selected from the group consisting of a $-CN$, $-CH_2Z$, $-COR'''$,

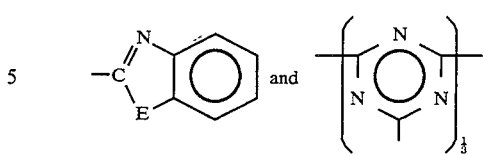

where:
E is $-NH-$, $-O-$ or $-S-$, and furthermore with the proviso:
(A) when $Y = -CH_2Z$, Z is $OR''$, where $R''$ is a hydrogen atom, or:

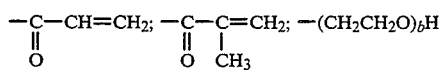

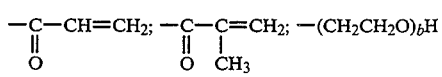

(where b is a number ranging from 1 to 15);

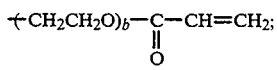

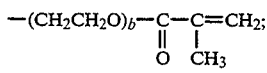

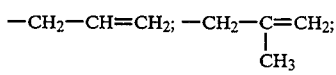

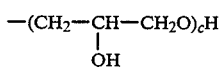

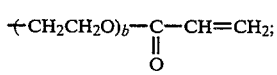

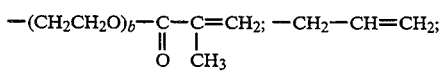

(c = a number from 1 to 3);

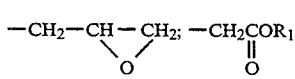

where $R_1 =$ an alkyl containing from 1 to 30 carbon atoms, an alkyl containing ether bonds of type $-C-O-C-$, $-(CH_2-CH_2O)_nH$, wherein n is a number ranging from 1 to 15, a naphthyl group, a benzyl group, or a mono- or poly-substituted alkyl or alkoxy benzyl group of the type:

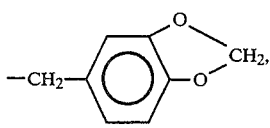

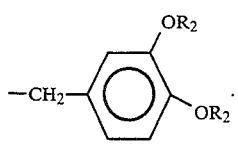

where $R_2$ = an alkyl containing from 1 to 4 carbon atoms; or Z is a nitrogen-containing group —$NR_3R_4$; where $R_3$ and $R_4$, alike or different from each other, are hydrogen atoms or they are, either individually or both, $R_1$ groups as defined above, or, when $R_3$=H, $R_4$ is:

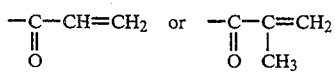

or $R_3$ and $R_4$ together form a cyclic imide of formula:

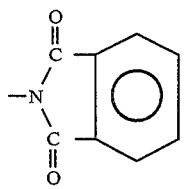

wherein the phenyl group contains a substituent group of the anhydride type;

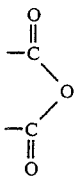

(B) when Y=COR''' group, R''' is selected from the group consisting of —$NHR_5$ where $R_5$ is hydrogen $C_1$-$C_8$ alkyl, $C_1$-$C_8$ mono- or polyhydroxyalkyl, $C_1$-$C_8$ aminoalkyl, allyl group, methallyl group, $R_6$—Si$(OCH_3)_3$ or $R_6$Si-$(OC_2H_5)_3$, where $R_6$ is $C_1$-$C_8$ alkylene, $R_7$NCO, where $R_7$ is $C_1$-$C_8$ alkylene, $C_5$-$C_6$ cycloalkylene, $C_6$-$C_{10}$ arylene, an unsubstituted aromatic radical or a substituted aromatic radical selected from the group consisting of pentafluorophenyl, bromotetrafluorophenyl, dibromodifluorophenyl, bromophenyl and bromobenzophenyl,

where: T' is selected from the group consisting of Alog $CF_2CF_2$—, Alog $CF_2$— and Alog $CF_2CF$(Alog)—:
R, R', Alog and Y are the same as defined above for formula (I);
p ranges from 1 to 20, and s/p ranges from 0.5 to 2; and

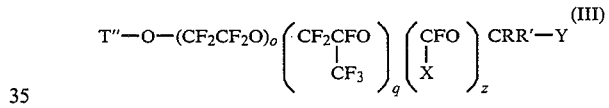

where: Y, X, R and R' are the same as defined above for formula (I), T" is equal to T or T', o and q are integers, zero included, o+q ranges from 1 to 20, z/o+q ranges from 0.01 to 0.05.

* * * * *